United States Patent [19]
Pritchard et al.

[11] Patent Number: 5,327,855
[45] Date of Patent: Jul. 12, 1994

[54] AQUARIUM

[76] Inventors: Rodney R. Pritchard, 946 4th Street, Mississauga, Ontario, Canada, L5E 1J9; Mark B. Eisen, 567 Deloraine Ave., North York, Ontario, Canada, M5M 2C5

[21] Appl. No.: 79,950

[22] Filed: Jun. 23, 1993

[51] Int. Cl.$^5$ .......................................... A01K 64/00
[52] U.S. Cl. ........................................... 119/267
[58] Field of Search ............... 119/15, 3, 5, 247–253, 119/257, 258, 267; 47/69, 68; D30/101, 102, 103, 104, 105, 106, 107

[56] References Cited

U.S. PATENT DOCUMENTS

| | | | |
|---|---|---|---|
| D. 247,105 | 1/1978 | Kovach | D11/4 |
| D. 247,960 | 5/1978 | Riedeman | D11/2 |
| D. 251,416 | 3/1979 | Kovack | D11/2 |
| D. 254,874 | 4/1980 | Totten | D30/104 |
| D. 310,060 | 8/1990 | Salgado et al. | D30/101 X |
| 3,696,789 | 10/1972 | Richard | 119/5 |
| 4,300,478 | 11/1981 | Wise | 119/5 |
| 4,516,529 | 5/1985 | Lotito et al. | 119/5 |
| 4,580,526 | 4/1986 | Rasmussen | 119/5 |
| 5,230,298 | 7/1993 | Pearce | 119/5 |

*Primary Examiner*—Thomas Price

[57] ABSTRACT

The invention provides an aquarium configured with its front and rear walls converging toward the top so that at tabletop or countertop height the viewer can comfortably view the aquarium from an ordinary standing position without bending over. From this viewing position the viewer cannot see through the rear face when the aquarium is filled with water, because the viewer's line of sight is at a sufficient angle that internal reflection occurs.

8 Claims, 3 Drawing Sheets

AQUARIUM

FIELD OF INVENTION

This invention relates to tropical fish aquariums. In particular, this invention relates to an improved aquarium configured to provide better viewing from an ordinary viewing position.

BACKGROUND OF THE INVENTION

Aquariums are widely used for keeping the numerous varieties of tropical fish which are available today. Typically the aquarium is set up on a table or stand at countertop height or lower. Since virtually all aquariums are rectangular, this makes viewing the fish from the optimum position—perpendicular to an area just above the centre of the viewing face—somewhat difficult. Adults usually resort to bending over, which makes for uncomfortable viewing after a short time. Furthermore, because the filled aquarium is largely transparent from front to back, the viewer will see air tubes, electrical cords and other unsightly distractions behind the aquarium unless a photograph of a marine scene or like background is affixed outside the rear wall, facing forward, to hide such objects.

The present invention overcomes these disadvantages by providing an aquarium configured with its front and rear walls converging toward the top. Thus, at tabletop or countertop height the viewer can comfortably view the aquarium from an ordinary standing position, without bending over, even at a short distance from the aquarium. Either the front face or the rear face may equally serve as the viewing face. In either case, around the optimum viewing position the viewer cannot see through the opposite face when the aquarium is filled with water, because the viewer's line of sight is at a sufficient angle to the 'rear' face that internal reflection occurs. Thus, around this viewing position the viewer sees a reflection on the rear wall of the aquarium.

SUMMARY OF THE INVENTION

The present invention thus provides an aquarium having a transparent body, comprising a bottom and sides joined to front and rear faces which converge upwardly toward a top opening.

BRIEF DESCRIPTION OF THE DRAWINGS

In drawings which illustrate by way of example only a preferred embodiment of the invention.

DETAILED DESCRIPTION OF THE INVENTION

Figure 1:
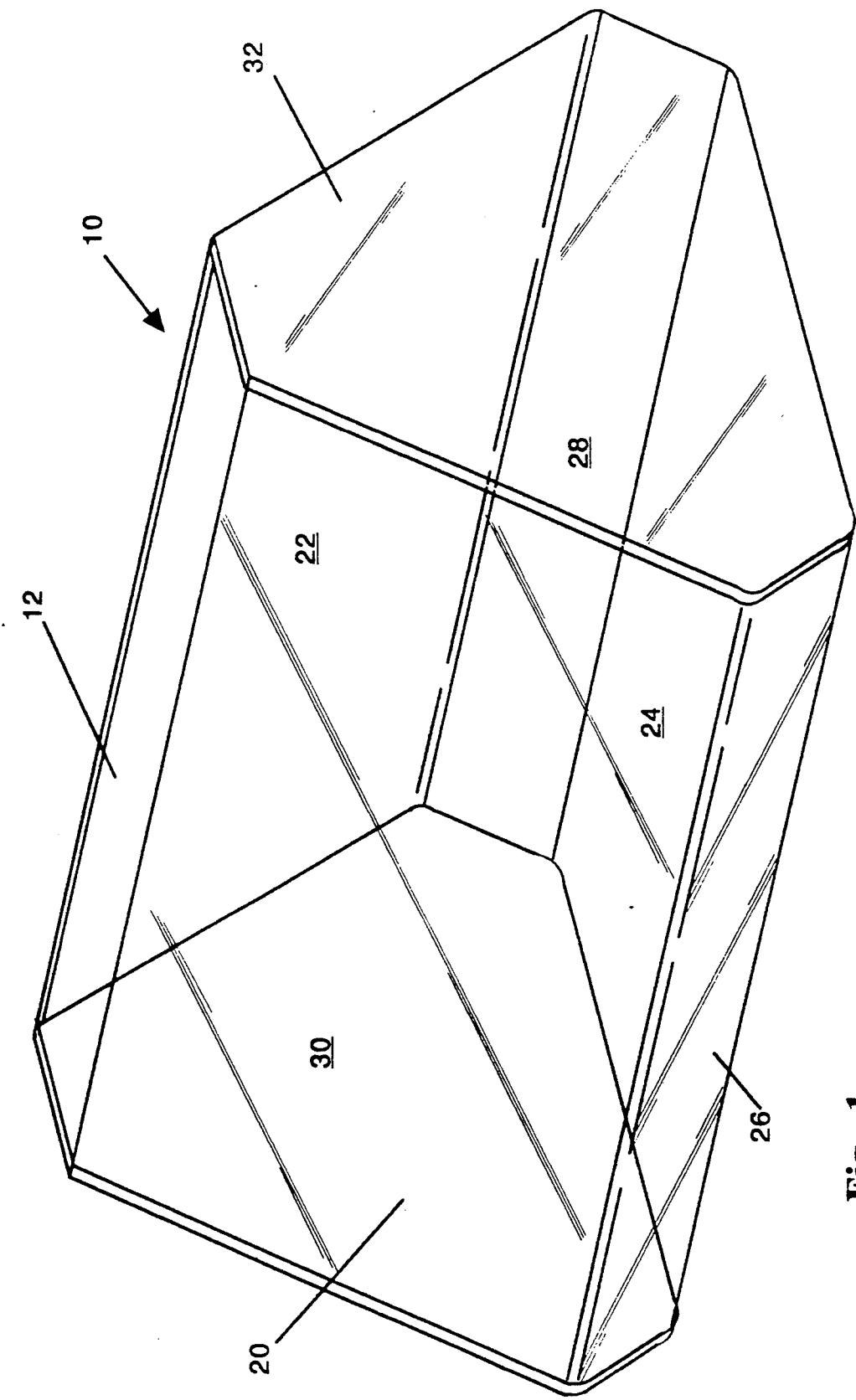
FIG. 1 is a perspective view of the aquarium.
Figure 2:
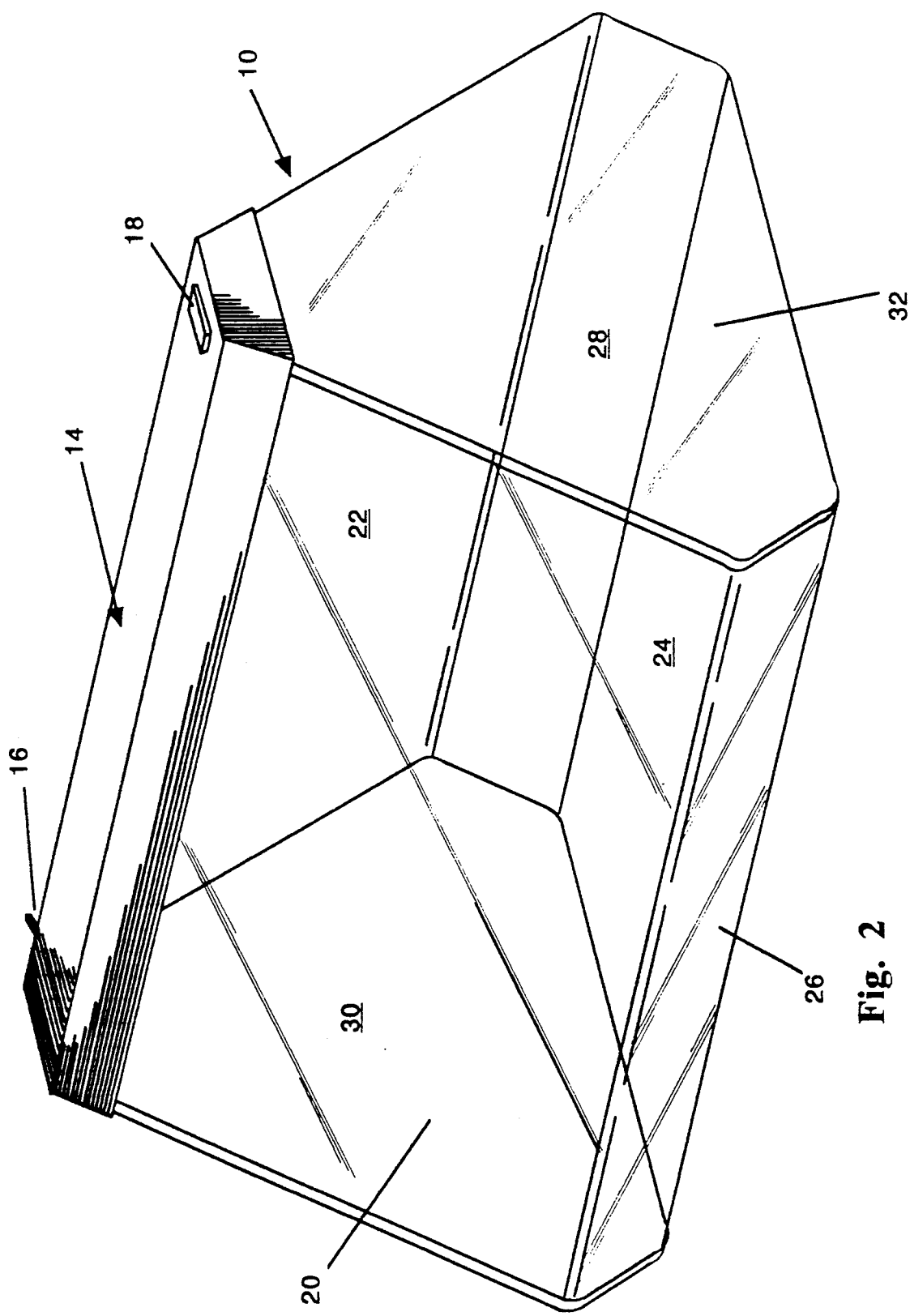
FIG. 2 is a perspective view of the aquarium with canopy.

As illustrated in FIG. 1, the aquarium 10 is formed with large generally planar faces 20,22 inclined relative to the bottom 24. In the embodiment shown, a single sheet of suitably thick plexiglass is bent to form the faces 20,22, the bottom 24 and the shallow diverging walls 26,28 and is then bonded to the ends 30,32 in a conventional fashion, leaving an opening 12 at the top for access to the aquarium interior. Plexiglass is preferred for its transparency, ease of manufacture and strong bonding properties, but any suitable plastic or glass may be used.

In a preferred embodiment a top to cover the opening 12 comprises a plastic canopy 14 containing a conventional aquarium lamp switched at 16, an opening or notch (not shown) for air tubes, heater cords and the like, and optionally a covered feeding hatch 18.

The large faces of the aquarium 20,22 are angled acutely from the bottom 26, preferably in the range of 60 to 70 degrees. Preferably also the faces 20,22 are symmetrical about the vertical longitudinal plane P through the centre of the body 12 (shown in FIG. 3), so that either of the faces 20,22 can serve equally as a viewing face, and the aquarium is thus well suited to be placed in the centre of a room. It is not necessary to include the diverging walls 26,28, which are provided for aesthetic purposes only. The diverging walls 26,28 should be shallow enough that the gravel will cover them, or else a viewer in an ordinary viewing position will readily see through them.

Figure 3:
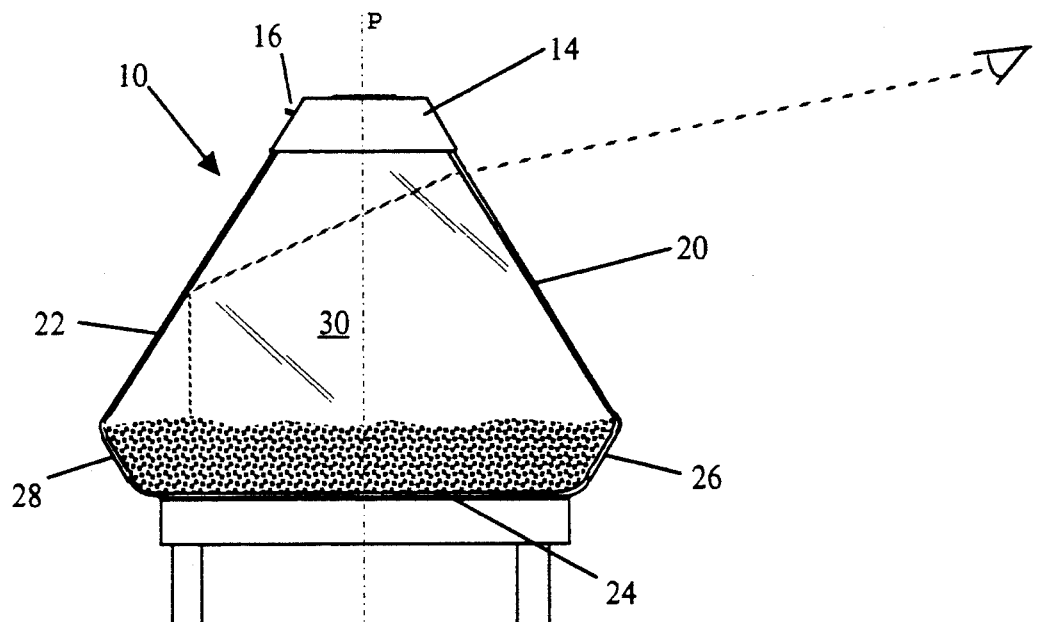
FIG. 3 is a side elevation showing a viewer's line of sight from an ordinary viewing position.

Provided that the large faces 20,22 converge toward the top, so that the aquarium is essentially a triangle in cross-section as seen in FIG. 3, the aquarium 10 becomes a prism when filled with water, and the viewing faces 20,22 refract light according to well known principles of optics. A particularly interesting effect results when the lamp is on because to the viewer the light is effectively originating inside the prism.

Figure 4:
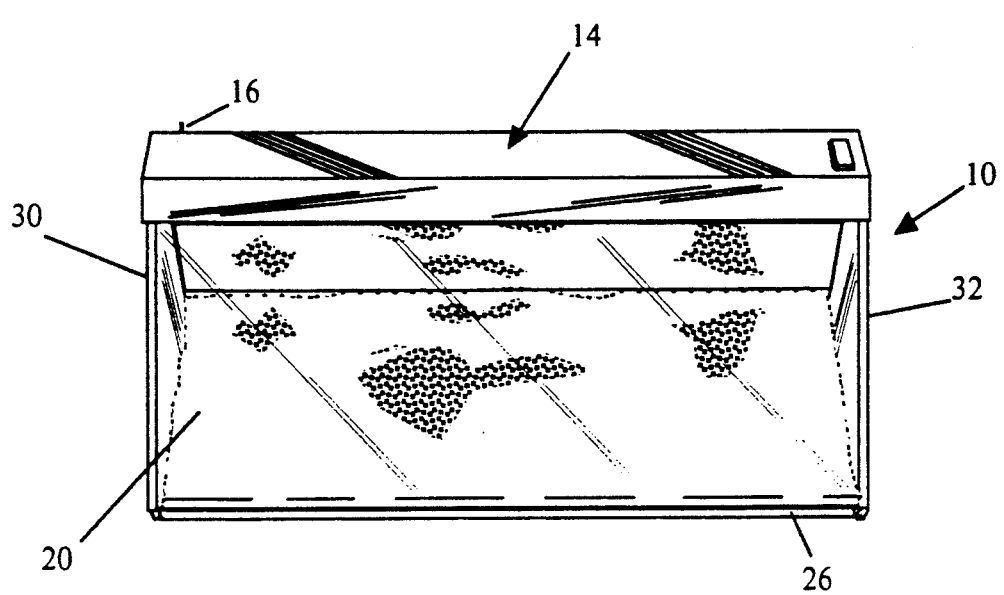
FIG. 4 is a front view of the filled aquarium showing the perspective of the viewer in FIG. 3.

FIG. 3 shows the face 20 as the viewing face, for purposes of illustration. When the aquarium is filled with water, the rear face 22 becomes more reflective as the viewer's line of sight approaches the critical angle. Because of the angle of the viewing face 20, the ideal viewing position is as shown in FIG. 3, perpendicular to an area just above the centre of the viewing face 20. This is an ordinary standing position for adults if the aquarium is at tabletop or countertop level. At this position, and within a range around it, the viewer's line of sight is close to or past the critical angle, at which point the rear face 22 is completely reflective. This is shown notionally in FIG. 3, and FIG. 4 shows the image seen by the viewer in FIG. 3.

The invention having thus been described by reference to a preferred embodiment thereof, it will be obvious to those skilled in the art that variations and modifications of the invention may be made without departing from the scope of invention, as set out in the appended claims.

We claim:

1. An aquarium having a transparent plastic body comprising a bottom integral with generally planar rectangular front and rear faces,
   generally vertical plastic ends bonded to side edges of the bottom and front and rear faces such that the body is water-tight,
   an opening for access into the aquarium extending between top edges of the front and rear faces, and
   a canopy containing a lamp to cover the opening,
   wherein the front and rear faces are angled acutely at a sufficient angle relative to the bottom such that when the aquarium is filled with water light inside the aquarium reflects internally off of the rear face and through the front face.

2. The aquarium defined in claim 1 wherein the bottom and the front and rear faces are formed from a rectangular sheet of plastic.

3. The aquarium defined in claim 1 in which the ends overlap the side edges of the front and rear faces.

4. The aquarium defined in claim 1 including shallow diverging walls extending between the front and rear faces and the bottom.

5. The aquarium defined in claim 4 in which the diverging walls meet the front and rear faces at rounded corners.

6. The aquarium defined in claim 1 in which the canopy includes front and rear faces in alignment respectively with the front and rear faces of the aquarium body.

7. The aquarium defined in claim 6 wherein the canopy includes a feeding hatch in a top surface thereof.

8. The aquarium defined in claim 1 wherein the front and rear faces each incline at an angle of 60 to 70 degrees relative to the bottom.

* * * * *